United States Patent
Lubin et al.

(10) Patent No.: US 7,418,110 B2
(45) Date of Patent: Aug. 26, 2008

(54) METHOD AND APPARATUS FOR COMPRESSED-DOMAIN WATERMARKING

(75) Inventors: Jeffrey Lubin, Princeton, NJ (US); Michael Anthony Isnardi, Plainsboro, NJ (US); Jeffrey Adam Bloom, West Windsor, NJ (US); Christos Alkiviadis Polyzois, Lawrenceville, NJ (US)

(73) Assignee: Transpacific Information, LLC, Wilmington, DE (US)

( * ) Notice: Subject to any disclaimer, the term of this patent is extended or adjusted under 35 U.S.C. 154(b) by 611 days.

(21) Appl. No.: 10/872,962

(22) Filed: Jun. 21, 2004

(65) Prior Publication Data

US 2005/0025336 A1 Feb. 3, 2005

Related U.S. Application Data

(60) Provisional application No. 60/479,775, filed on Jun. 19, 2003, provisional application No. 60/480,307, filed on Jun. 20, 2003.

(51) Int. Cl.
*G06K 9/00* (2006.01)

(52) U.S. Cl. .................. 382/100; 382/288; 380/205

(58) Field of Classification Search ........ 382/100, 382/168, 170, 172, 181, 189, 232, 243, 233–238, 382/254, 274, 275–276, 288, 294, 305, 250, 382/283; 380/210, 205, 212; 713/155
See application file for complete search history.

(56) References Cited

U.S. PATENT DOCUMENTS

| 6,104,826 | A  | * | 8/2000 | Nakagawa et al. ......... 382/100 |
| 6,188,728 | B1 |   | 2/2001 | Hurst |
| 6,553,127 | B1 | * | 4/2003 | Kurowski ................... 382/100 |
| 6,674,873 | B1 | * | 1/2004 | Donescu et al. ............ 382/100 |
| 6,757,407 | B2 | * | 6/2004 | Bruckstein et al. ......... 382/100 |
| 6,785,401 | B2 | * | 8/2004 | Walker et al. .............. 382/100 |
| 6,944,313 | B1 | * | 9/2005 | Donescu .................... 382/100 |
| 7,113,615 | B2 | * | 9/2006 | Rhoads et al. ............. 382/100 |

OTHER PUBLICATIONS

International Search Report dated Dec. 29, 2004 from corresponding PCT application, PCT/US04/19630.
Jack Lacy et al., "Intellectual Property Protection Systems and Digital Watermarking", Optics Express 478, vol. 3, No. 12, Dec. 7, 1998.

* cited by examiner

*Primary Examiner*—Seyed Azarian
(74) *Attorney, Agent, or Firm*—McDonnell Boehnen Hulbert & Berghoff LLP

(57) ABSTRACT

A method and apparatus for inserting a low frequency watermark into a compressed data stream carrying compressed content is disclosed. A portion of the compressed data stream is decoded to generate decoded content. The decoded content is analyzed to generate watermark insertion information. The compressed content is embedded with a low frequency watermark using the watermark insertion information.

27 Claims, 6 Drawing Sheets

IMAGE PROCESSING SYSTEM   1000

METHOD AND APPARATUS FOR COMPRESSED-DOMAIN WATERMARKING

CROSS-REFERENCE TO RELATED APPLICATIONS

This application claims benefit of U.S. provisional patent application Ser. Nos. 60/479,775, filed Jun. 19, 2003, and 60/480,307, filed Jun. 20, 2003, which are herein incorporated by reference.

This invention was made with U.S. government support under contract number NIST 70NANB1H3036. The U.S. government has certain rights in this invention.

BACKGROUND OF THE INVENTION

Embodiments of the present invention generally relate to digital watermarking. Digital watermarks can be applied to image content, moving (video) or stationary (still pictures). These watermarks can serve a variety of purposes, including the tracking of unauthorized copies back to the party who licensed the use of the content and who was responsible for preventing its further distribution.

There are several watermarking techniques for images/video, covering a wide range of properties. These techniques are generally applicable in the pixel domain, i.e., they can insert watermarks in the raw (uncompressed) images.

In practice, video is usually compressed before being distributed on a physical medium (e.g., DVD) or over a network (e.g., soft copy downloadable over the Internet). If the watermark payload is different for every copy and the watermark is applied in the pixel domain, then each individual copy needs to be compressed, since it is different from every other copy. This concept is illustrated in FIG. 1. Compression can be a very expensive operation both from a computing resource standpoint (it requires a lot of computational power) as well as from a human resource standpoint (it is very common to have a human inspect the results of the compression algorithm and adjust parameters to improve the visual result). The cost of the per-copy operations renders the watermark insertion in the pixel domain untenable for these applications.

For watermarking of material already in the compressed domain (e.g., DVDs, Internet downloads), it is important that the watermark embedding process does not result in extensive changes in the bitstream, because this could undermine compression choices made at the time of the initial encoding both to optimize the perceived quality of the encoding, and to maintain rate control, bit-rate, and other profile constraints of the intended application.

Therefore, there is a need in the art for watermarking content in the compressed domain. There is also a need in the art for inserting a watermark in the compressed domain with minimal change to the bitstream.

SUMMARY OF THE INVENTION

The present invention generally discloses a method and apparatus for inserting a low frequency watermark in the compressed domain. In one embodiment, a portion of the compressed data stream is decoded to generate decoded content. The decoded content is analyzed to generate watermark insertion information. The compressed content is embedded with a low frequency watermark using the watermark insertion information In another embodiment a low frequency watermark is inserted into the compressed domain by positioning the watermark in a central frame based on a maskability calculation. A trajectory of a center of gravity of the watermark is determined. A reduced amplitude version of the watermark at frames neighboring the central frame is inserted.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention discloses techniques for performing watermarking-related operations on compressed content. The following discussion focuses on video, but the techniques are equally applicable to still pictures or other audio/visual content.

Watermarking is the modification of content (e.g., pixel values or transform coefficients) in order to represent some auxiliary data. This auxiliary data can be characterized as a payload and usually comprises a sequence of binary bits. Applying the modifications to the original content yields a marked copy. Applying the modifications to a flat field (all pixels and all transform coefficients of all frames have constant value—essentially a blank picture) yields a watermark sequence. A unique payload results in a unique watermark sequence.

Figure 1:
FIG. 1 is an illustration of watermark insertion in the pixel domain.

Typically, if one were to watermark compressed content, a decode operation and subsequent re-encode operation (i.e., the compression per copy operation of FIG. 1) would need to be performed. This operation is not acceptable since quality of the watermarked content would be reduced.

Figure 2:
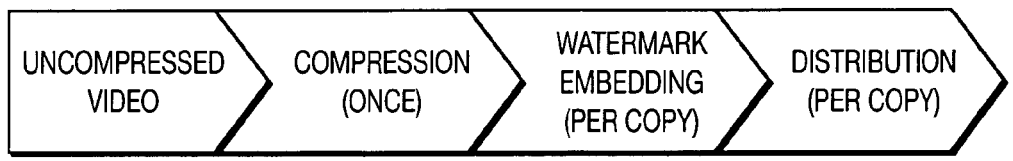
FIG. 2 is an illustration of watermark insertion in the compressed domain in accordance with one embodiment of the present invention.

Ideally, one would like to embed the watermarks after compression, so that compression is performed only once. This is illustrated in FIG. 2.

Figure 3:
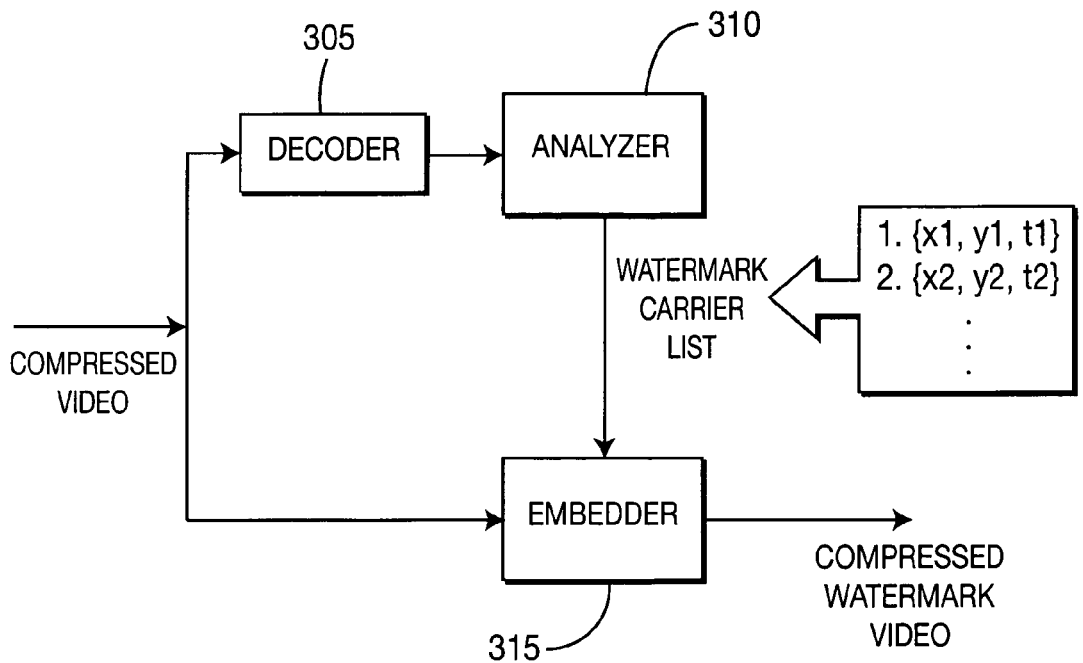
FIG. 3 illustrates a system in accordance with one embodiment of the present invention.

FIG. 3 illustrates a system in accordance with one embodiment of the present invention. Compressed content is decoded by decoder 305. The decoded content is evaluated by analyzer

310. Analyzer 310 creates a watermark carrier list, which comprises spatiotemporal locations for watermarks. The watermark carrier list is used by embedder 315 to insert watermarks into the compressed content. The embedding may be accomplished in real time. In one embodiment, embedder 315 is a Discrete Cosine Transform (DCT) domain embedder. It should be noted that the present invention discloses the insertion of watermarks in the transform domain and not the pixel domain. Thus, the present invention is able to insert watermarking in the compressed domain.

Figure 4:
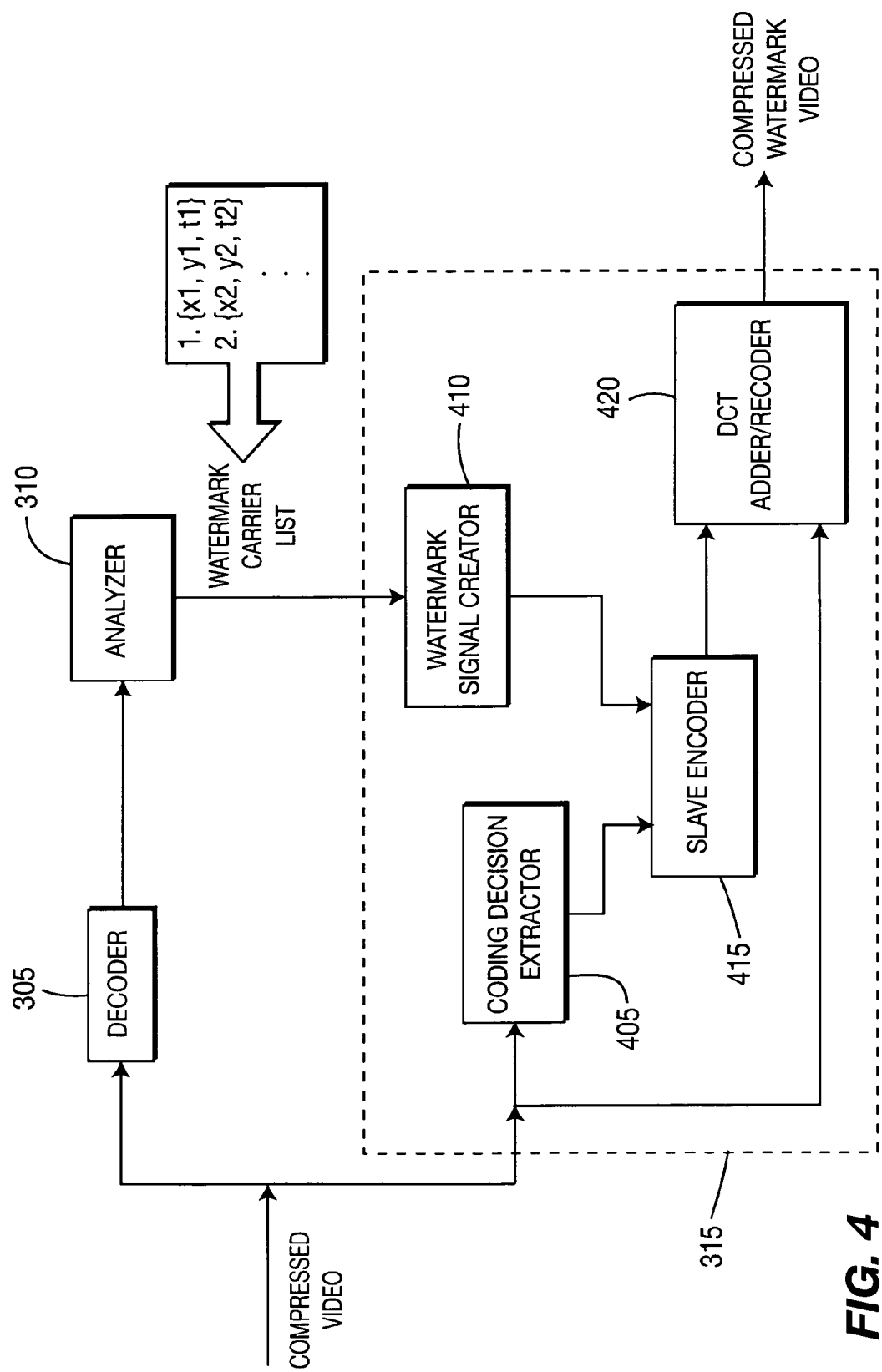
FIG. 4 illustrates a DCT domain embedder in accordance with one embodiment of the present invention.

FIG. 4 illustrates a DCT domain embedder in accordance with one embodiment of the present invention. Based on information received from analyzer 310, a watermark sequence is created by watermark signal creator 410. The watermark sequence is encoded by a "slave" encoder 415. Coding decision extractor 405 reads the encoding decisions made by the encoder that produced the compressed version of the original video and passes the encoding decisions to slave encoder 415. Slave encoder 415 encodes the watermark sequence using the same decisions. DCT adder/recoder combines the encoded watermark sequence and the compressed content. Thus, the original video sequence and the watermark sequence are encoded in a compatible way and can be combined efficiently in the DCT (or other linear transform) domain without full decoding.

Figure 5:
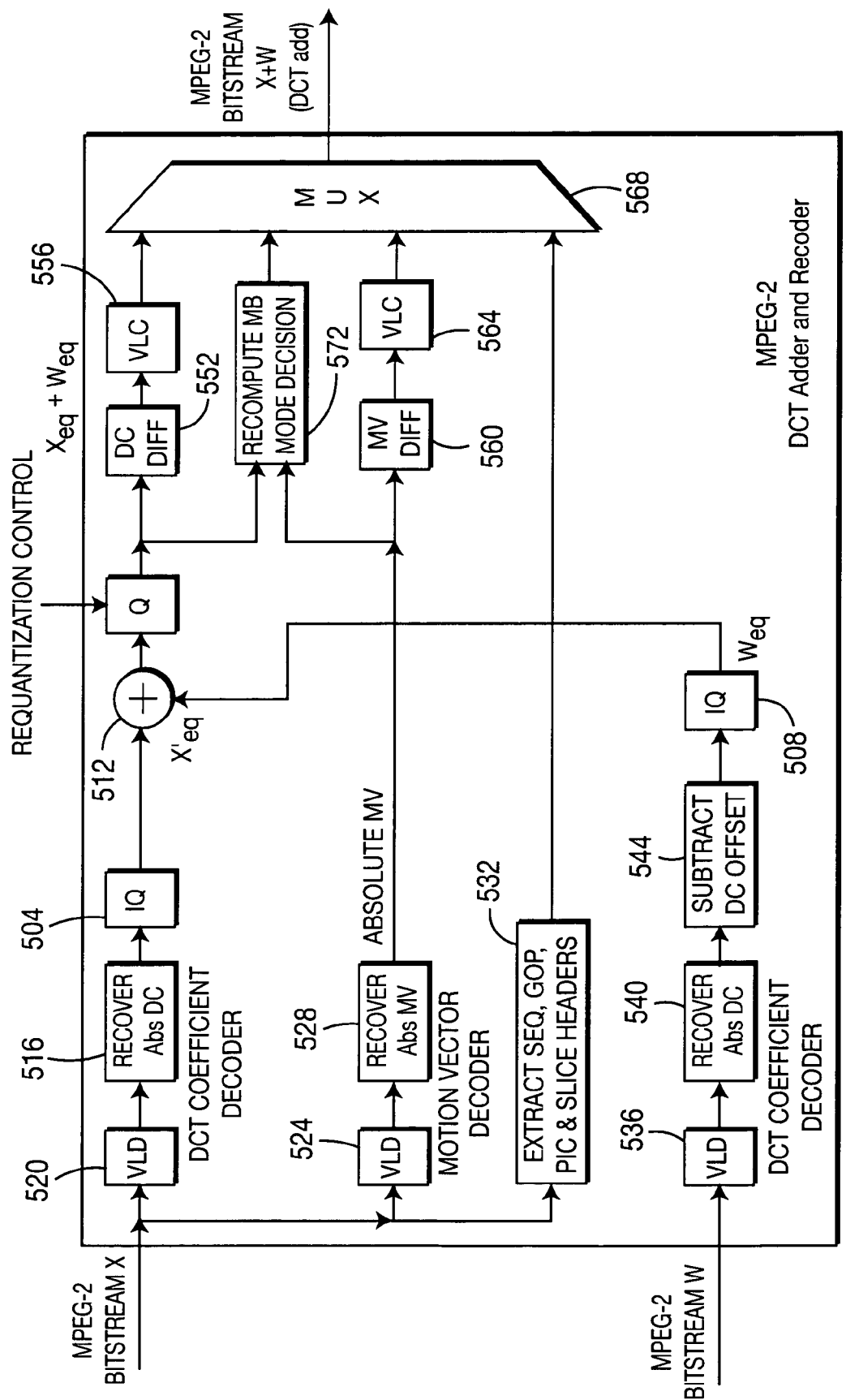
FIG. 5 illustrates one embodiment of DCT adder/recoder in accordance with one embodiment of the present invention.

FIG. 5 illustrates one embodiment of DCT adder/recoder 420. Bitstream X is, for example, a compressed data stream carrying compressed content. Bitstream X is variable length decoded (VLD) by VLD 520 to recover the quantized DCT coefficients for each macroblock in DCT recovery block 516. Bitstream W is also variable length decoded (VLD) by VLD 536 to recover the quantized DCT coefficients for each macroblock in DCT recovery block 540. The temporal reference, motion vectors and mode decisions must also be variable length decoded in VLD 524, recovered in recovery block 528 and used to partially encode the watermark W. The recovered absolute DCT coefficients of X (main bitstream) and W (watermark bitstream) are added by adder 512 in the DCT domain.

In one embodiment, the addition of the DCT coefficients is accomplished by piping 64 floating-point numbers per block into the adder. If desired, the addition of the DCT coefficients may be accelerated.

In one embodiment, the acceleration of the addition of DCT coefficients is accomplished by sending the DCT coefficients in run-length format. This action drastically reduces the piping bandwidth for those blocks that only have a few non-zero coefficients. In another embodiment, the acceleration of the addition of DCT coefficients is accomplished by only performing the addition for blocks in the watermark bitstream that have non-zero DCT coefficients.

In one embodiment, the recovered absolute DCT coefficients of X (main bitstream) and W (watermark bitstream) are inverse quantized by inverse quantizers 504, 508 prior to addition by adder 512 in the DCT domain. In this embodiment, quantization follows addition in quantizer 548. Inverse quantizers 504, 508 and quantizer 548 are optional elements, however, when utilized, these optional elements allow proper handling of the non-linear quantization option allowed by MPEG-2, and also allows requantization. Requantization may be required in applications that require strict control of the watermarked bit count (e.g., watermarked bit count for each coded frame must be no more than 0.5% higher than original bit count).

Block 532 determines the length of each segment. It should be understood that segment length may be determined by a number of factors, including, but not limited to, group of picture (GOP) size, the number of frames, and time.

The quantized DCT coefficients of partially decoded X and partially encoded W are added together, and new variable-length codes (VLCs) 556, 564 are produced as a function of the new quantized DCT coefficients (Xeq+Weq) 552 and the Motion Vectors (MVx) 560 and Mode Decisions (MDx) 572 from bitstream X. The new quantized DCT coefficients 552, Motion Vectors 560 and Mode Decisions 572 are combined by multiplexer 568.

For applications in which playback of the new bitstream is from a digital storage medium, such as an optical or hard disk, Video Buffering Verifier (VBV) violations are allowed and will not affect the quality of playback. For streaming applications, however, the VBV trajectory of the new bitstream must be made compliant.

Because of the extremely low spatio-temporal variation of the watermark, it is highly certain that the only modification would be changes in the DC component of macroblocks (MBs) containing the watermark. Since bitstream W is created with an offset, e.g., a midlevel of 128, block 544 is needed to remove this offset. The modification of the DC component of MBs containing the watermark is accomplished in block 544. The DC differentials for these MBs would be slightly larger, and the VLCs will be slightly longer. This means that bit counts for frames containing watermark data will be slightly larger. For MPEG-2 bitstreams coded using the "VBV Delay Method", there is a danger that the VBV will, over time, underflow. For bitstreams coded using the "0xFFFF" method, the VBV trajectory usually "rides high" in the buffer, and there is a much lower chance that the VBV will underflow, even over the long term. However, to further guard against occasional buffer underflow in the "0xFFFF" case, the sequence-level bit_rate parameter can be made slightly higher, or it can be forced to the maximum allowed by the MPEG-2 profile and level.

If MPEG-2 bitstream X is coded using the "VBV Delay Method": 1. replace the 16-bit vbv_delay value in the picture header with "0xFFFF", and 2. increase the 18-bit bit_rate_value in the sequence header and the 12-bit bit_rate_extension in the sequence extension to the maximum allowed by the MPEG-2 profile and level.

If MPEG-2 bitstream X is coded using the "0xFFFF Method": 1. increase the 18-bit bit_rate_value in the sequence header and the 12-bit bit_rate_extension in the sequence extension to the maximum allowed by the MPEG-2 profile and level.

Figure 6:
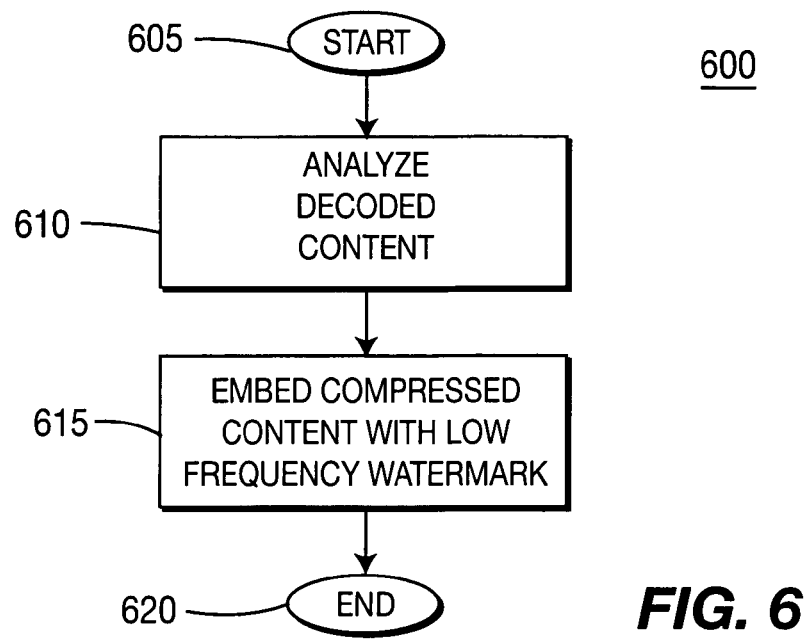
FIG. 6 illustrates a method 600 in accordance with one embodiment of the present invention.

FIG. 6 illustrates a method 600 in accordance with one embodiment of the present invention. Method 600 starts in step 605 and proceeds to step 610.

Decoded content is analyzed in step 610. Step 610 creates a watermark carrier list that provides spatiotemporal locations for low frequency watermarks.

Step 615 embeds compressed content with a low frequency watermark. Based on information, e.g. watermark carrier list, received from analyzer 310, embedder 315 creates a watermark sequence. Embedder 315 reads the encoding decisions made by the encoder that produced the compressed version of the original video and encodes the watermark sequence using the same decisions. Embedder 315 combines the encoded watermark sequence and the compressed content.

Figure 7:
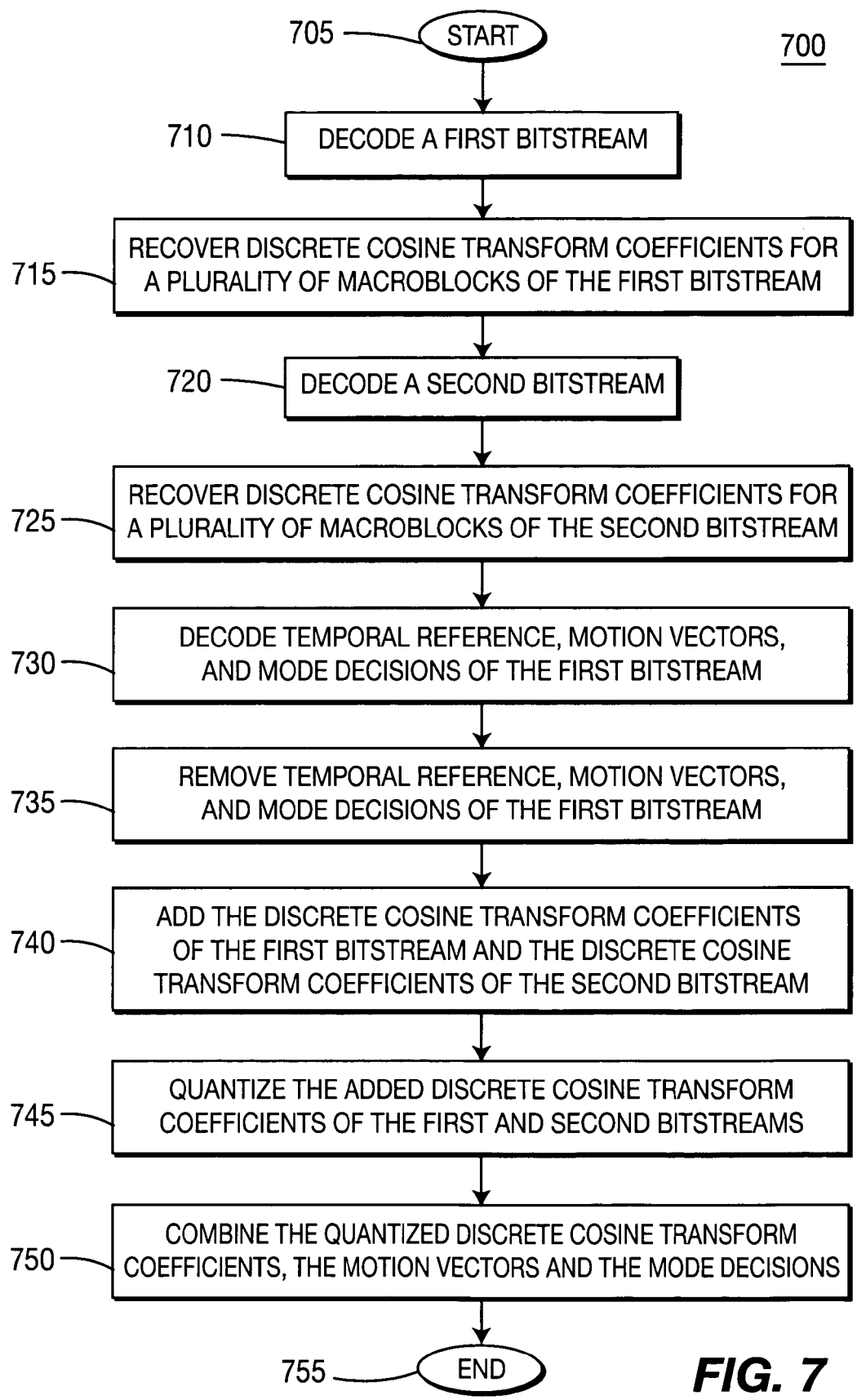
FIG. 7 illustrates a method 700 in accordance with one embodiment of the present invention.

FIG. 7 illustrates a method 700 in accordance with one embodiment of the present invention. Method 700 starts in step 705 and proceeds to step 710.

In step 710, a first bitstream is decoded by decoder 520. In step 715, discrete cosine transform coefficients for a plurality of macroblocks of the first bitstream are recovered by recovery module 516. In step 720 a second bitstream is decoded by decoder 536. In step 725, discrete cosine transform coefficients for a plurality of macroblocks of the second bitstream are recovered by recovery module 540. In step 730, temporal reference, motion vectors, and mode decisions of the first bitstream are decoded by decoder 524. In step 735, temporal reference, motion vectors, and mode decisions of the first bitstream are recovered by recovery module 528. In step 740, the discrete cosine transform coefficients of the first bitstream and the discrete cosine transform coefficients of the second bitstream are added by adder 512. In step 745, the added discrete cosine transform coefficients of the first and second bitstreams are quantized by quantizer 548. In step 750, the quantized discrete cosine transform coefficients, the motion vectors and the mode decisions are combined into a bitstream by multiplexer 568.

Figure 8:
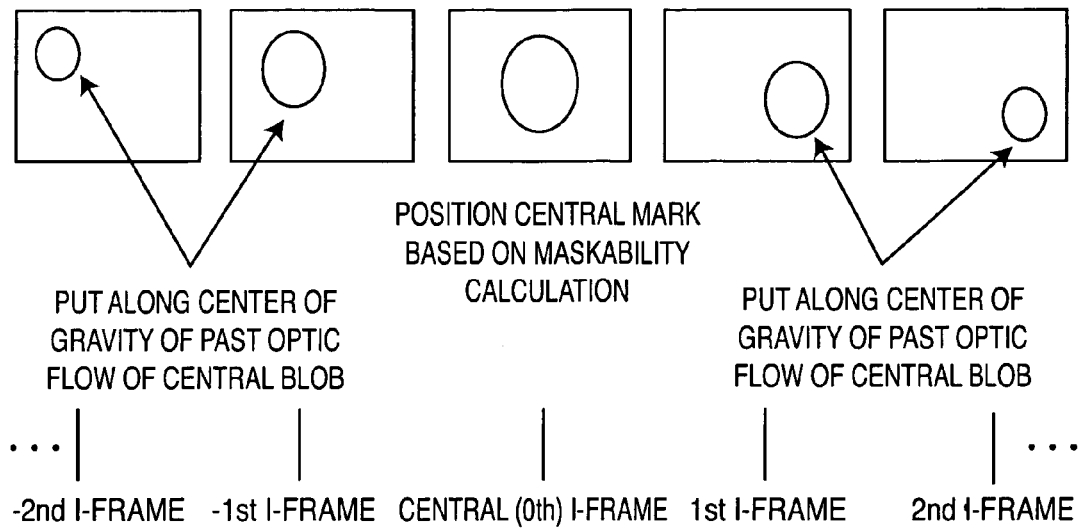
FIG. 8 illustrates insertion of a watermark in the compressed domain in accordance with one embodiment of the present invention.

When embedding a watermark that is intended to persist over many frames, one can insert the watermark in an I-frame only, and then observe the "bleeding" of the mark to P- and B-frames in the temporal neighborhood of this I-frame. Furthermore, to the extent that motion estimation is tracking moving objects, this bleeding of the mark will tend to track the objects as well, with some dispersion as the temporal distance from the I-frame increases. This concept is illustrated in FIG. 8.

Figure 9:
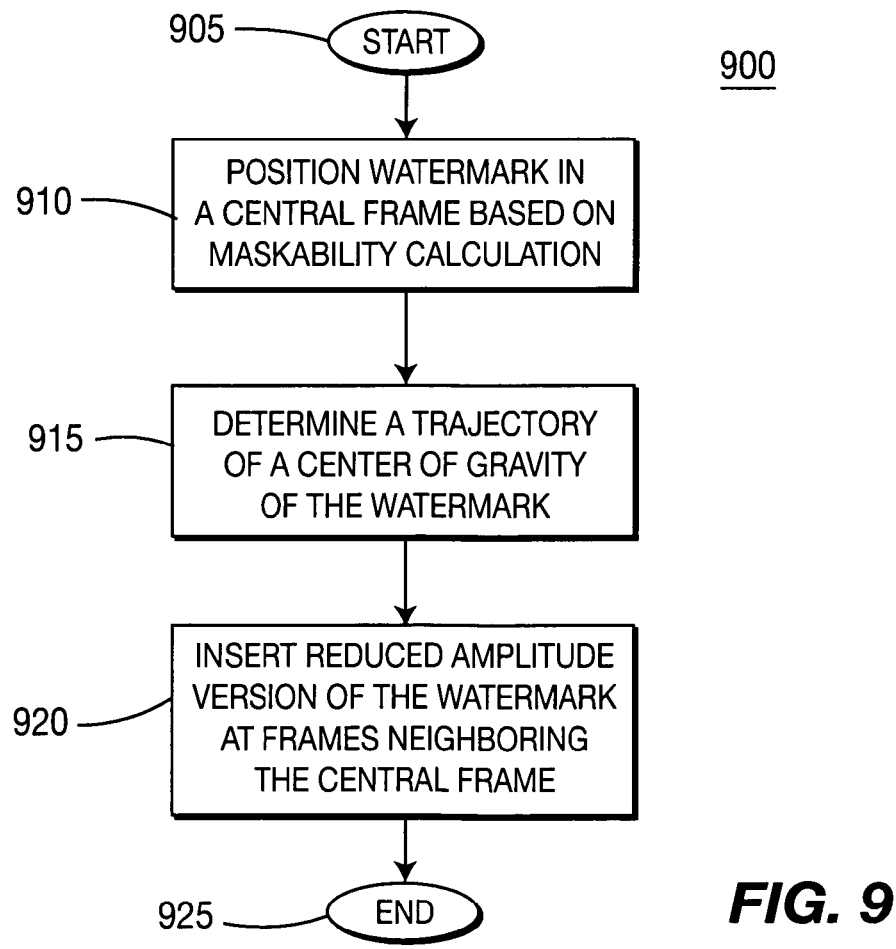
FIG. 9 illustrates a method in accordance with one embodiment of the present invention.

FIG. 9 illustrates a method 900 of inserting a watermark in the compressed domain according to one embodiment of the present invention. Method 900 starts in step 905 and proceeds to step 910.

In step 910, a watermark is positioned in a central frame according to a maskability calculation. In one embodiment, the central frame is selected based on the peak of a spatiotemporal Guassian.

In step 915, a trajectory of a center of gravity of the watermark is determined. In one embodiment, the trajectory of the center of gravity of the watermark is determined over previous and subsequent I-frames.

In step 920, a reduced amplitude version of the watermark at frames neighboring the central frame is inserted. In one embodiment, the reduced amplitude version of the watermark is inserted at neighboring I-frames. In another embodiment, instead of inserting a reduced amplitude version of the watermark at neighboring I-frames, a different method may be used in order to reduce the visibility of any effect of abrupt changes from a dispersed image of the mark (e.g., in P- or B-frames) to a pure Gaussian in a non-central I-frame. In this embodiment, the "dispersed" version of the watermark, can be copied from a neighboring P- or B-frame onto the desired I-frame, with appropriate amplitude reduction to mimic the temporal fall-off of the pure Gaussian. The intended effect here is for the Gaussian watermark to reduce in amplitude and disperse as one proceeds further from the central I-frame in both temporal directions. In either case, the selected path and geometry of each watermark pattern is saved for use in subsequent detection operations.

Figure 10:
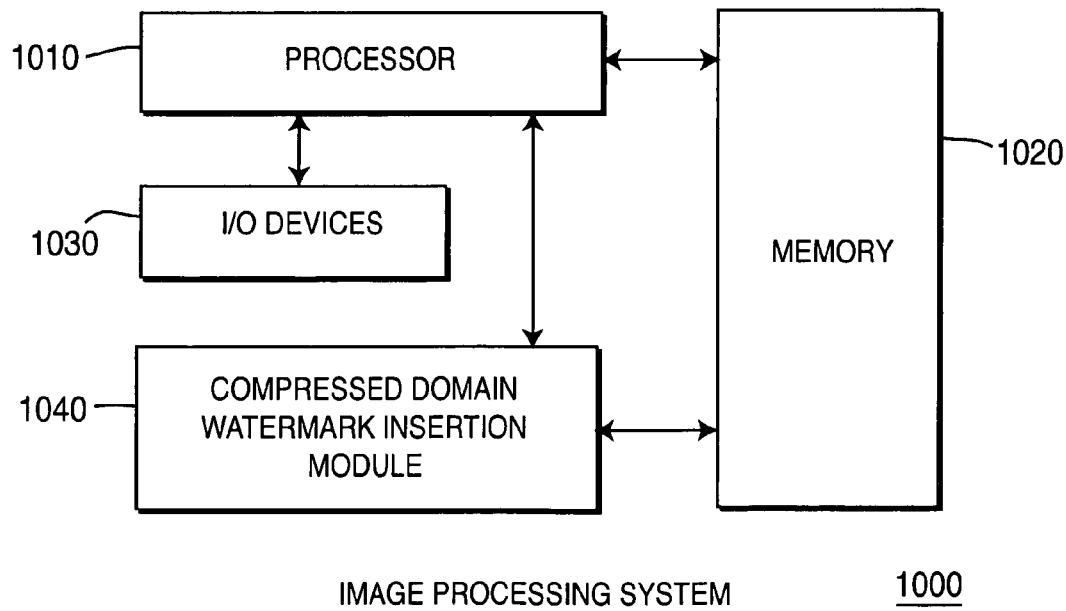
FIG. 10 illustrates a block diagram of an image processing device or system in accordance with one embodiment of the present invention.

FIG. 10 illustrates a block diagram of an image processing device or system 1000 of the present invention. Specifically, the system can be employed to insert low frequency watermarks in the compressed domain. In one embodiment, the image processing device or system 1000 is implemented using a general purpose computer or any other hardware equivalents.

Thus, image processing device or system 1000 comprises a processor (CPU) 1010, a memory 1020, e.g., random access memory (RAM) and/or read only memory (ROM), compressed domain watermark insertion module 1040, and various input/output devices 1030, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the compressed domain watermark insertion module 1040 can be implemented as one or more physical devices that are coupled to the CPU 1010 through a communication channel. Alternatively, the compressed domain watermark insertion module 1040 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 1020 of the computer. As such, the compressed domain watermark insertion module 1040 (including associated data structures) of the present invention can be stored on a computer readable medium, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method of inserting a low frequency watermark into a compressed data stream carrying compressed content, comprising:
    decoding a portion of the compressed data stream to generate decoded content;
    analyzing the decoded content to create a watermark carrier list; and
    embedding the compressed content with a low frequency compressed watermark signal using the watermark carrier list to combine the compressed watermark signal with the compressed content.

2. The method of claim 1, wherein the watermark carrier list comprises spatiotemporal locations for watermarks.

3. The method of claim 1, wherein the embedding step occurs in real time.

4. An apparatus for inserting a low frequency watermark into a compressed data stream carrying compressed content, comprising:
    means for decoding a portion of the compressed data stream to generate decoded content;
    means for analyzing the decoded content to create a watermark carrier list, wherein the watermark carrier list comprises spatiotemporal locations for watermarks; and
    means for embedding the compressed content with a low frequency watermark using the watermark carrier list.

5. A computer-readable medium having stored thereon a plurality of instructions, the plurality of instructions including instructions which, when executed by a processor, cause the processor to perform the steps of a method of inserting a low frequency watermark into a compressed data stream carrying compressed content, comprising of:
    decoding a portion of the compressed data stream to generate decoded content;
    analyzing the decoded content to create a watermark carrier list, wherein the watermark carrier list comprises spatiotemporal locations for watermark; and
    embedding the compressed, content with a low frequency watermark using the watermark carrier list.

6. An apparatus for inserting a low frequency watermark into a compressed data stream carrying compressed content, comprising:
- a decoder for decoding a portion of the compressed data stream to generate decoded content;
- an analyzer for analyzing the decoded compressed content to create a watermark carrier list, wherein the watermark carrier list comprises spatiotemporal locations for watermarks; and
- an embedding for embedding compressed content with a low frequency compressed watermark signal using the watermark carrier list to combine the compressed watermark signal with compressed content.

7. The apparatus of claim 6, wherein the embedder comprises:
- a coding decision extractor for extracting encoding decisions made by an encoder that produced the compressed data stream;
- a watermark signal creator for creating a watermark sequence based on the watermark insertion information;
- a slave encoder for encoding the watermark sequence in accordance with the extracted encoding decisions; and
- an adder/recoder the combining the encoded watermark sequence and the compressed data stream.

8. An adder/recoder for inserting a low frequency watermark into a compressed data stream carrying compressed content, comprising:
- a first variable length decoder for decoding a first bitstream;
- a first recovery module for recovering discrete cosine transform coefficients for a plurality of macroblocks of the first bitstream;
- a second variable length decoder for decoding a second bitstream;
- a second recovery module for recovering discrete cosine transform coefficients for a plurality of macroblocks of the second bitstream;
- a third variable length decoder for decoding temporal reference, motion vectors, and mode decisions of the first bitstream:
- a third recovery module for recovering temporal reference, motion vectors, and mode decisions of the first bitstream;
- an adder for adding the discrete cosine transform coefficients of the first bitstream and the discrete cosine transform coefficients of the second bitstream; and
- a multiplexer for combining the discrete cosine transform coefficients, the motion vectors and the mode decisions.

9. The apparatus of claim 8, wherein discrete cosine transform coefficients are added by piping 64 floating-point numbers per block into the adder.

10. The apparatus of claim 8, wherein an acceleration of adding discrete cosine transform coefficients is accomplished by sending the discrete cosine transform coefficients in run-length format.

11. The apparatus of claim 8, wherein an acceleration of adding discrete cosine transform coefficients is accomplished by only performing the addition for blocks in a bitstream of the watermark that have non-zero DCT coefficients.

12. The apparatus of claim 8, further comprising:
- a first inverse quantizer for inverse quantizing the discrete cosine transform coefficients of the first bitstream before the adding step;
- a second inverse quantizer for inverse quantizing the discrete cosine transform coefficients of the second bitstream before the adding step; and
- a quantizer for quantizing the added discrete cosine transform coefficients of the first and second bitstreams.

13. The apparatus of claim 12, wherein requantization is performed by the quantizer.

14. A method of inserting a low frequency watermark into a compressed data stream carrying compressed content, comprising:
- decoding a first bitstream; recovering discrete cosine transform coefficients for a plurality of macroblocks of the first bitstream;
- decoding a second bitstream; recovering discrete cosine transform coefficients for a plurality of macroblocks of the second bitstream;
- decoding temporal reference, motion vectors, and mode decisions of the first bitstream;
- recovering temporal reference, motion vectors, and mode decisions of the first bitstream;
- adding the discrete cosine transform coefficients of the first bitstream and the discrete cosine transform coefficients of the second bitstream; and
- combining the discrete cosine transform coefficients, the motion vectors and the mode decisions.

15. The method of claim 14, wherein discrete cosine transform coefficients are added by piping 64 floating-point numbers per block into the adder.

16. The method of claim 14, wherein an acceleration of adding discrete cosine transform coefficients is accomplished by sending the discrete cosine transform coefficients in run-length format.

17. The method of claim 14, wherein an acceleration of adding discrete cosine transform coefficients is accomplished by only performing the addition for blocks in a bitstream of the watermark that have non-zero DCT coefficients.

18. The method of claim 14, further comprising:
- inverse quantizing the discrete cosine transform coefficients of the first bitstream prior to the adding step;
- inverse quantizing the discrete cosine transform coefficients of the second bitstream prior to the adding step; and
- quantizing the added discrete cosine transform coefficients of the first and second bitstreams.

19. The method of claim 18, wherein requantization is performed by the quantizer.

20. A computer-readable medium having stored thereon a plurality of instructions, the plurality of instructions including instructions which, when executed by a processor, cause the processor to perform the steps of a method of inserting a watermark into a compressed data stream carrying compressed content, comprising of:
- decoding a first bitstream;
- recovering a discrete cosine transform coefficients for a plurality of macroblocks of the first bitstream;
- decoding a second bitstream;
- recovering discrete cosine transform coefficients for a plurality of macroblocks of the second bitstream;
- decoding temporal reference, motion vectors, and mode decisions of the first bitstream;
- recovering temporal reference, motion vectors, and mode decisions of the first bitstream;
- adding the discrete cosine transform coefficients of the first bitstream and the discrete cosine transform coefficients of the second bitstream; and
- combining the discrete cosine transform coefficients, the motion vectors and the mode decisions.

21. The computer-readable medium of claim 20, further comprising:
inverse quantizing the discrete cosine transform coefficients of the first bitstream prior to the adding step;
inverse quantizing the discrete cosine transform coefficients of the second bitstream prior to the adding step; and
quantizing the added discrete cosine transform coefficients of the first and second bitstreams.

22. A method of inserting a watermark in the compressed domain, comprising:
positioning the watermark in a central frame based on a maskability calculation, wherein the central frame is selected based on the peak of a spatiotemporal Gaussian;
determining a trajectory of a center of gravity of the watermark; and
inserting a reduced amplitude version of the watermark at least one frame neighboring the central frame.

23. The method of claim 22, wherein the trajectory of the center of gravity of the watermark is determined over previous and subsequent I-frames.

24. The method of claim 23, wherein the reduced amplitude version of the watermark is copied from a P or B-frame into a neighboring I-frame.

25. The method of claim 22, wherein the reduced amplitude version of the watermark is inserted at neighboring I-frames.

26. An apparatus for inserting a watermark in the compressed domain, comprising:
means for positioning a watermark in a central frame based on a maskability calculation;
means for determining a trajectory of a center of gravity of the watermark over previous and subsequent I-frames; and
means for inserting a reduced amplitude version of the watermark at least one frame neighboring the central frame.

27. A computer-readable medium having stored thereon a plurality of instructions, the plurality of instructions including instructions which, when executed by a processor, cause the processor to perform the steps of a method of inserting a watermark in the compressed domain, comprising:
positioning a watermark in a central frame based on a maskability calculation;
determining a trajectory of a center of gravity of the watermark; and
inserting a reduced amplitude version of the watermark at least one I-frame neighboring the central frame.

* * * * *